United States Patent [19]

Ikeura et al.

[11] 4,359,894

[45] Nov. 23, 1982

[54] THROTTLE VALVE MOST CLOSED POSITION SENSING SYSTEM

[75] Inventors: Kenji Ikeura; Kunifumi Sawamoto, both of Yokosuka, Japan

[73] Assignee: Nissan Motor Company, Limited, Kanagawa, Japan

[21] Appl. No.: 230,288

[22] Filed: Jan. 30, 1981

[30] Foreign Application Priority Data

Jan. 31, 1980 [JP] Japan ................................ 55-10501

[51] Int. Cl.$^3$ ........................................... G01M 15/00

[52] U.S. Cl. .................................................. 73/118

[58] Field of Search ...................... 73/118, 116, 117.3; 364/551; 123/478

[56] References Cited

U.S. PATENT DOCUMENTS 3,871,214 3/1975 Masaki et al. ........................ 73/116

4,118,976 10/1978 Mitsuda et al. ...................... 73/118

FOREIGN PATENT DOCUMENTS 2350208 5/1974 Fed. Rep. of Germany .

53-22920 3/1978 Japan .................................. 73/118

*Primary Examiner*—Jerry W. Myracle

*Attorney, Agent, or Firm*—Lowe, King, Price & Becker

[57] ABSTRACT

A throttle-valve most closed position sensing system is disclosed for use with an internal combustion engine. The system includes a throttle position sensor for providing a signal indicative of the degree of opening of the associated throttle-valve. A decision circuit is provided for deciding throttle-valve position as the most closed position when receiving a throttle-valve position indicative signal smaller than or equal to the smallest signal having received from the throttle position sensor.

6 Claims, 3 Drawing Figures

THROTTLE VALVE MOST CLOSED POSITION SENSING SYSTEM

BACKGROUND OF THE INVENTION

1. Field of the Invention

This invention relates to a throttle-valve position sensing system for use with an internal combustion engine having an induction passage provided therein with a throttle valve and, more particularly, to such a system for sensing the most closed position possible for the throttle valve.

2. Description of the Prior Art

In order to detect engine deceleration and idling conditions, throttle-valve closed position sensors have been used which include an idle switch adapted to provide a signal when the throttle valve is in its closed positions. Such an idle switch has a contact fixed at a suitable position and a contact movable, with rotation of the throttle valve, into and out of contact with the fixed contact. The movable contact moves into contact with the fixed contact when the throttle valve is in its closed positions.

However, such conventional throttle-valve closed position sensors suffer from certain disadvantages. First, they cannot detect engine deceleration and idling conditions in case where a fast-idle mechanism is used to force the throttle valve to remain open at low engine temperatures for fast engine warming. Second, the accuracy with which they detect engine deceleration and idling conditions is greatly affected by secular fluctuation.

The present invention provides a system which can sense the most closed position possible for a throttle valve.

SUMMARY OF THE INVENTION

The present invention provides a throttle-valve most closed position sensing system for use with an internal combustion engine having an induction passage provided therein with a throttle valve. The system comprises a throttle position sensor for providing a signal proportional to the degree of opening of the throttle valve. A decision circuit is provided for deciding throttle-valve position as the most closed position when receiving, from the throttle position sensor, a signal smaller than or equal to the smallest signal having received therefrom.

The decision circuit may be adapted to store a received signal value in place of a previously stored value and decide throttle valve position as the most closed position when the received signal value is smaller than or equal to the previously stored value. Preferably, the decision circuit is arranged to decide throttle-valve position as the most closed position also when the received signal value is smaller than the sum of the previously stored value and a predetermined value.

Of course, the throttle position sensor may provide a signal inversely proportional to the degree of opening of the throttle valve. In this case, the decision circuit should be arranged to decide throttle valve position as the most closed position when receiving, from the throttle position sensor, a signal larger than or equal to the largest signal having received therefrom.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENT

Figure 1:
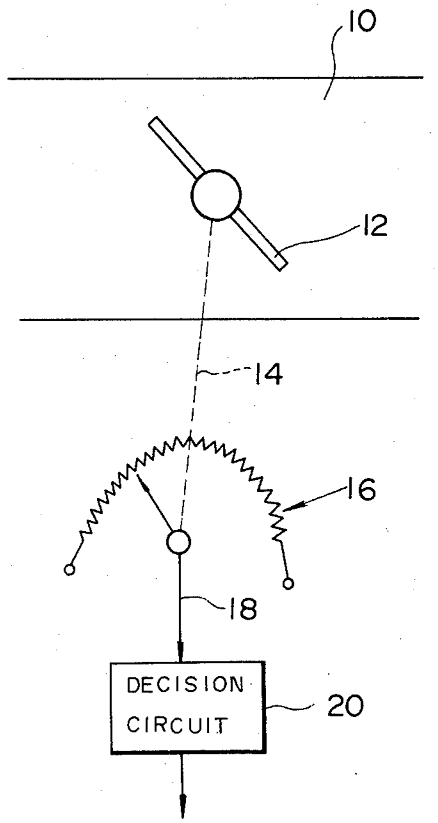
FIG. 1 is a schematic view showing one embodiment of a throttle-valve most closed position sensing system made in accordance with the present invention.

Referring now to FIG. 1, the reference numeral 10 designates an induction passage having its one end opening into atmosphere and the other end thereof connected to an engine. The induction passage 10 has therein a throttle valve 12 drivingly connected to the acceleration pedal (not shown) for controlling the flow of air or air-fuel mixture to the engine. The throttle valve 12 is connected by a mechanical link 14 to a throttle position sensor 16 for providing a signal indicative of the position of the throttle valve 12. Preferably, the throttle position sensor 16 is a potentiometer electrically connected in a voltage divider circuit for supplying a DC voltage proportional to throttle-valve position. The throttle position sensor 16 is connected through a line 18 to a decision circuit 20 including a digital computer. The decision circuit 20 is adapted to determine the most closed position possible for the throttle valve 12 from the output of the throttle position sensor 16.

Figure 2:
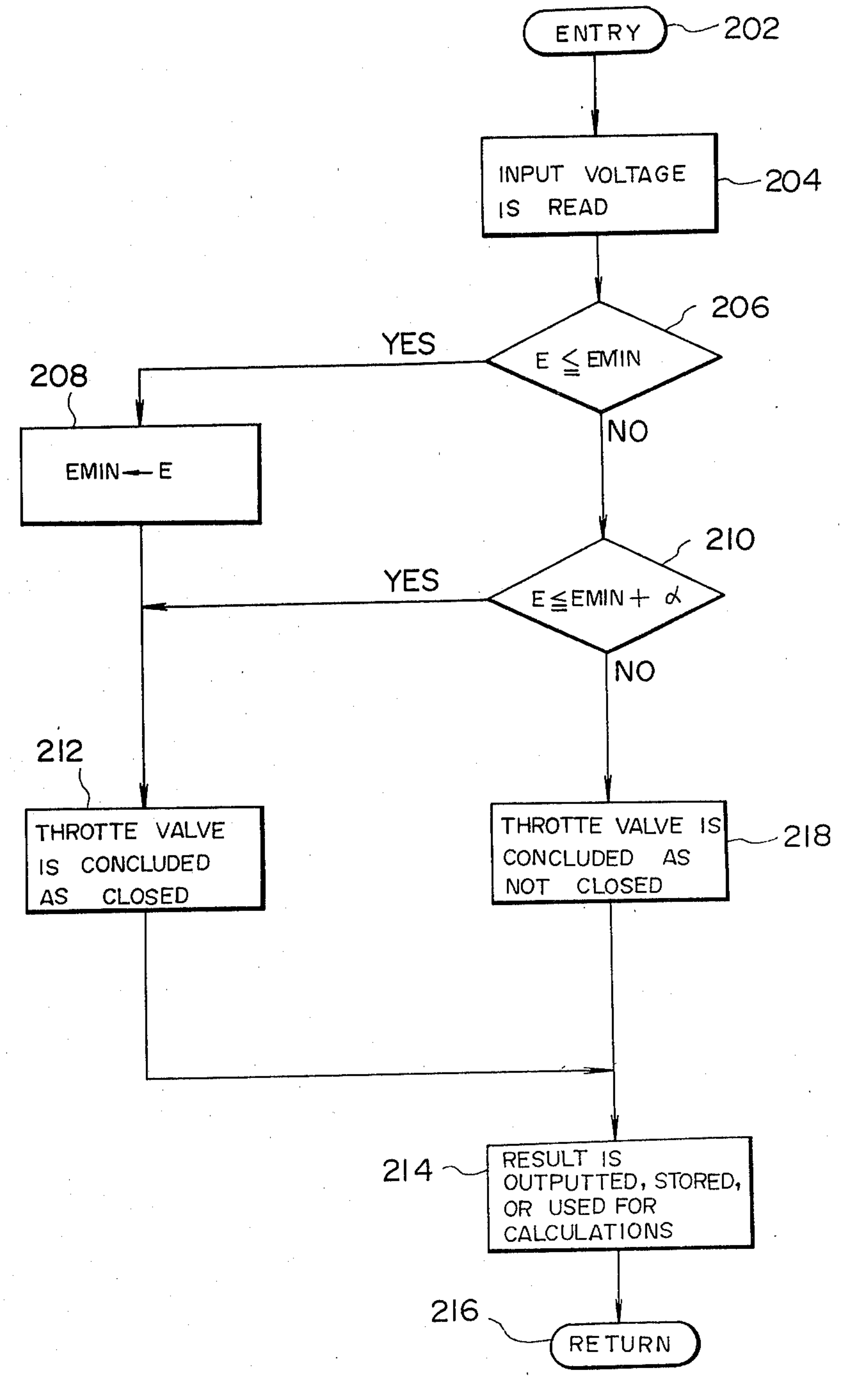
FIG. 2 is a flow diagram used in explaining the operation of the digital computer included in the decision circuit of FIG. 1.

FIG. 2 is a flow diagram illustrative of the operation of the digital computer used in the decision circuit 20 to determine the most closed position possible for the throttle valve. The computer program is entered at the point 202. At the point 204 in the program, the value E of the voltage fed thereto through the line 18 from the throttle position sensor 16 is read into the computer memory. At the point 206, a determination is made as to whether the read voltage value E is smaller than or equal to a value Emin which has been stored as a minimum voltage value in the computer memory during previous program executions. If the answer to this question is "yes", then the program proceeds to the point 208 where the read voltage value E is stored as a new minimum voltage value in place of the previously stored value Emin for comparison with a voltage value in the following program execution. If the answer to the question is "no", then the program proceeds to a decision at the point 210, this decision step being discussed hereinafter.

After the minimum voltage value is changed to a new value at the point 208, the program proceeds to the point 212 where it is concluded that the throttle valve 12 is in its closed position. At the following point 214, the concluded condition is outputted, stored, or used for calculations. Following this, the program proceeds to the point 216 where the program returns to the entry point 202.

The determination at the point 210 is whether or not the read voltage value E is smaller than the minimum voltage value Emin plus a predetermined value $\alpha$. The value $\alpha$ may be properly selected with regard to errors which would occur in the system. If the answer to this question is "yes", then the program proceeds to the point 212 where it is concluded that the throttle valve is in its closed position. If the answer to the question is "no", then the program proceeds to the point 218 where it is concluded that the throttle valve is not in its closed position. Following this, the program proceeds to the point 214 where the concluded condition is outputted, stored, or used for calculations, and then to the point 216 where the program returns to the entry point 202.

The decision circuit 20 stores a voltage value as a minimum voltage value Emin when it is smaller than or equal to the smallest voltage value having fed from the throttle position sensor 16 and stored in the memory. Thereafter, the stored minimum voltage value Emin is used for comparison with the values of the voltage signal fed from the throttle position sensor 16. If any voltage occurs which has its value smaller than or equal to the stored minimum voltage value Emin, the decision circuit 20 stores it as a new minimum voltage value instead of the previously stored value and concludes that the throttle valve is in its closed position. Preferably, the input voltage value is compensated for errors which would occur in the system. For this purpose, the decision circuit 20 is adapted to conclude that the throttle valve is in its closed position when the value of the input voltage signal is smaller than or equal to the sum of the stored minimum voltage value Emin and a predetermined value $\alpha$ suitably selected with regard to errors which would occur in the system.

Figure 3:
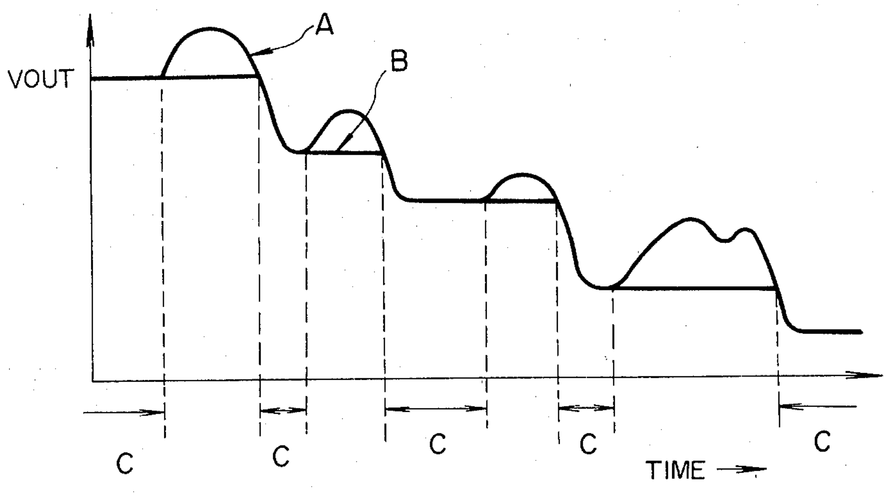
FIG. 3 is a graph showing the range where the decision circuit decides throttle-valve position as the most closed position.

Assuming now that the output of the throttle position sensor 16 changes as shown by curve A of FIG. 3, the minimum voltage value stored in the decision circuit 20 changes as indicated by curve B of FIG. 3. In FIG. 3, the letter C indicates the range where the decision circuit 20 concludes that the throttle valve 12 is in its closed position.

It is to be understood, of course, that the throttle position sensor 16 may be of the type providing a DC voltage inversely proportional to the degree of opening of the throttle valve 12. In this case, the decision circuit 20 should be arranged to conclude that the throttle valve is in its closed position when receiving a voltage having a value larger than or equal to the largest voltage value having fed thereto from the throttle position sensor and stored therein. For this purpose, the decision circuit 20 stores a received signal value in place of a previously stored value and decides throttle-valve position as the most closed position when the received signal value is larger than or equal to the previously stored value. In addition, the decision circuit is adapted to decide throttle-valve position as the most closed position also when the received signal value is larger than or equal to the resulting value of the previously stored value minus a predetermined value properly selected with regard to errors which would occur in the system.

It will be apparent from the foregoing that the throttle-valve most closed position sensing system of the present invention can detect the most closed position possible for a throttle valve. This arrangement permits detection of engine deceleration and idling conditions even though any fast-idle mechanism is used to force the throttle valve to remain open at low engine temperatures for fast engine warming. With the arrangement of the present invention, the accuracy of detection of engine deceleration and idling conditions is independent of secular fluctuation. In addition, the need for any accurate adjustment of position of the throttle position sensor with respect to the throttle valve is eliminated since engine deceleration and idling conditions are detected from the most closed position permitted for the throttle valve, regardless of variations in the region where the throttle-valve position indicative signal varies.

The decision circuit 20 may be constructed to provide a control signal when it concludes that the throttle valve is in its closed position. The control signal represents that the driver releases the acceleration pedal. The control signal may be used for spark timing control and fuel cutoff control during engine deceleration.

While the present invention has been described in connection with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A throttle-valve most closed position sensing system for use with an internal combustion engine having an induction passage provided thereinwith a throttle valve, said system comprising:

(a) a throttle position sensor for providing a signal proportional to the degree of opening of said throttle valve; and (b) a decision circuit for deciding throttle-valve position as the most closed position when receiving, from said throttle position sensor, a signal smaller than or equal to the smallest signal having received therefrom.

2. A system according to claim 1, wherein said decision circuit is adapted to store a received signal value in place of a previously stored value and decide throttle-valve position as the most closed position when the received signal value is smaller than or equal to the previously stored value.

3. A system according to claim 1, wherein said decision circuit is adapted to decide throttle-valve position as the most closed position also when the received signal value is smaller than or equal to the previously stored value plus a predetermined value.

4. A throttle-valve most closed position sensing system for use with an internal combustion engine having an induction passage provided therein with a throttle valve, said system comprising;

(a) a throttle position sensor for providing a signal inversely proportional to the degree of opening of said throttle valve; and (b) a decision circuit for deciding throttle-valve position as the most closed position when receiving, from said throttle position sensor, a signal larger than or equal to the largest signal having received therefrom.

5. A system according to claim 4, wherein said decision circuit is adapted to store a received signal value in place of a previously stored value and decide throttle-valve position as the most closed position when the received signal value is larger than or equal to the previously stored value.

6. A system according to claim 5, wherein said decision circuit is adapted to decide throttle-valve position as the most closed position also when the received signal value is larger than or equal to the previously stored value minus a predetermined value.

* * * * *